United States Patent
Demazeau et al.

(10) Patent No.: US 11,898,858 B2
(45) Date of Patent: Feb. 13, 2024

(54) SYSTEM AND METHOD FOR DETERMINING A SET OF ROUTES, IN A COMPUTERIZED ENVIRONMENT

(71) Applicant: AMADEUS S.A.S., Biot (FR)

(72) Inventors: Michel Demazeau, Nice (FR); Jacques Bonaud, Cagnes sur Mer (FR); Marco Salibba, Valbonne (FR); Jean-Philippe Perret, Montauroux (FR); Celine Soubra, Antibes (FR)

(73) Assignee: Amadeus S.A.S., Biot (FR)

( * ) Notice: Subject to any disclaimer, the term of this patent is extended or adjusted under 35 U.S.C. 154(b) by 614 days.

(21) Appl. No.: 17/009,141

(22) Filed: Sep. 1, 2020

(65) Prior Publication Data

US 2021/0063176 A1   Mar. 4, 2021

(30) Foreign Application Priority Data

Sep. 3, 2019 (FR) ...................................... 1909689

(51) Int. Cl.
    *G01C 21/34* (2006.01)
(52) U.S. Cl.
    CPC ..... *G01C 21/3446* (2013.01); *G01C 21/3484* (2013.01)
(58) Field of Classification Search
    CPC . G01C 21/3446; G01C 21/3484; H04L 45/12; H04L 45/30
    See application file for complete search history.

(56) References Cited

U.S. PATENT DOCUMENTS

2007/0073480 A1\* 3/2007 Singh ............... G08G 1/096805
                                                    701/420
2017/0059341 A1    3/2017 Vo et al.

OTHER PUBLICATIONS

Jean-François Bérubé et al., Time-dependent shortest paths through a fixed sequence of nodes: application to a travel planning problem Computers & Operations Research, vol. 33, Issue 6, Jun. 2006, pp. 1838-1856.
Cheng et al., "Measure dynamic individual spatial-temporal accessibility by public transit: Integrating time-table and passenger departure time", Journal of Transport Geography, vol. 66, Jan. 2018, pp. 235-247.
National Institute of Industrial Property, Preliminary Search Report issued in French Application No. 1909689 dated May 8, 2020.

\* cited by examiner

*Primary Examiner* — Jess Whittington
*Assistant Examiner* — Brian E Yang
(74) *Attorney, Agent, or Firm* — Thompson Hine LLP

(57) ABSTRACT

Systems and methods for determining a set of routes using a graph having nodes and links connecting the nodes. The routes are determined for one or more tokens, and each token is associated with an origin node and a destination node included in the graph and with a token weight. Token constraints, which include at least one constraint relative to the token weight, are received for each token. Candidate routes satisfying at least some of the token constraints are received for each token. Each candidate route includes at least one route link included in the graph and the each route link is associated with a link weight. Shared route links are those route links that share at least two tokens. The candidate routes are filtered based on a condition related to the link weight of each shared route link and to the weights of the tokens sharing the link.

17 Claims, 6 Drawing Sheets

SYSTEM AND METHOD FOR DETERMINING A SET OF ROUTES, IN A COMPUTERIZED ENVIRONMENT

BACKGROUND

The invention generally relates to client/server architectures and, in particular, to a system, a method, and computer program product for determining a set of routes, in response to a client request.

Over the past decades, content provider systems which are based on client/server based architectures have undergone dramatic changes due to the expansion of the Internet. In particular, most of the developments made to modern content provider systems aim at improving users' experience while limiting the system latency and optimizing their computational resources.

Modern content provider systems use one or more server computing devices (also referred to as server devices or servers) which receive client requests from client computing devices (also referred to as client devices) through a dedicated user interface via a communication network. A user can directly submit a request for content using a client device. The server device can comprise a search engine implementing one or more searching algorithms to determine a response to the request and return such response to the client device through the dedicated interface.

For example, in the field of the travel or carrier industry, content provider systems use a search engine to determine a set of routes matching a user request (also called 'travel request'). Currently, a travel request can be submitted at once, for a limited number of travelers, and for a trip which is exactly the same for all the travelers. This may be restricting when travelers, who are scattered in different cities or in different countries, wish to meet during the travel, for example when traveling for a specific event. Accordingly, existing travel provider systems only enable a group of users intended to travel together (e.g. as a group of friends, members of a family, or colleagues), each coming from a different location, to search and book separate travels. The travel provider systems can consume a lot of computational resources and have a low latency to perform such search. For example, if a determined number of users intend to travel together, all the potential routes, for each user, are computed. Then, the availability requests and the pricing requests, which are particularly resource consuming, are also processed for each user.

At the users' side, this takes much time to find a trip that would enable the set of users to travel together, considering the constraints of all the members of the group. The users of the group have to synchronize together to find the most relevant travel. Some users of the group may also fail to purchase the trip tickets in time, if all the tickets are finally sold, whereas another part of the users of the group has successfully purchased their tickets. As a result, this represents a loss of sales for the airline, and a decreased use of the travel provider system. Further, existing travel provider systems only stores an independent PNR (Passenger Name Record) per traveler. Accordingly, once the tickets have been purchased, each user of the group will be assigned a PNR (Passenger Name Record) independent from the others, which does not make easy for the different users of the group to travel side by side, as generally desired.

Improved systems, methods, and computer program products for determining a set of routes matching a user request identifying a set of users are therefore required.

SUMMARY

It is proposed, according to one aspect of the invention, a system for determining a set of routes, in a computerized environment, using a graph comprising a plurality of nodes and links connecting the nodes, the set of routes being determined for one or more tokens, each token being associated with an origin node and a destination node included in the graph and with a token weight, the system being configured to: receive, at a computer, a set of token constraints for each token, the token constraints received for each token comprising at least one constraint related to the token weight; determine, by the computer, and for each token, a set of candidate routes satisfying at least some of the token constraints received for the token, each candidate route being connected by the origin node and the destination node associated with the token, the candidate route comprising at least one route link included in the graph, the route link being associated with a link weight, determine, by the computer, shared route links, each shared route link being a route link comprised in a route in the sets of candidate routes determined for at least two tokens; and filter, by the computer, the set of candidate routes determined for the tokens based on a condition related to the weight of each shared route link in a route of the sets of candidate routes and to the weights of the tokens sharing the link.

According to particular embodiments of the invention, the system may be further configured to: compute a set of solutions, each solution comprising a unique combination of the candidate routes of the tokens and for each solution: determine a set of items, each item comprising a node or a link which is comprised in a candidate route determined for one or more tokens, and the one or more tokens; compute, for each item, an item value, the item value representing a time needed for a token to browse the node or link comprised in the item, multiplied by the number of tokens comprised in the item; determine a solution value by adding the item values of all the items of the solution; and select the solution having the optimal solution value, which provides a set of routes.

The system may be configured to compute the set of candidate routes for a given token by determining the routes having link weights matching a condition related to the token weight of the corresponding token.

Each route may further comprise a route duration value, the token constraints including a duration constraint related to the route duration value, a route of the set of candidate routes satisfying the duration constraint if the route has a route duration value which is inferior or equal to a predefined route maximum value.

Each route may further comprise one transit time value for each node of the route, the token constraints including a time constraint related to the route transit time, a route of the set of candidate routes satisfying the time constraint if all the nodes of the route have a transit time value which is inferior or equal to a predefined node maximum value.

The optimal value may be the highest value among the solution values.

Alternatively, the optimal value may be the lowest value among the solution values.

The system may be configured to filter the set of solutions based on a condition related to a comparison, for each item having a shared route link and at least two tokens, between the sum of the token weights of the at least two tokens and the weight of the shared route link of the item.

Each route further comprises a route cost value, the token constraints including a cost constraint related to the route cost value, a route of the set of candidate routes satisfying the cost constraint if the route has a cost value which is inferior or equal to a predefined maximum cost.

The invention also relates to a method for determining a set of routes, in a computerized environment, using a graph comprising a plurality of nodes and links connecting the nodes, the set of routes being determined for one or more tokens, each token being associated with an origin node and a destination node included in the graph and with a token weight, the method comprising: receiving, at a computer, a set of token constraints for each token, the token constraints received for each token comprising at least one constraint related to the token weight; determining, by the computer, and for each token, a set of candidate routes satisfying at least some of the token constraints received for the token, each candidate route being connected by the origin node and the destination node associated with the token, the candidate route comprising at least one route link included in the graph, the route link being associated with a link weight; determining, by the computer, shared route links, each shared route link being a route link comprised in a route in the sets of candidate routes determined for at least two tokens; and filtering, by the computer, the set of candidate routes determined for the tokens based on a condition related to the weight of each shared route link in a route of the sets of candidate routes and to the weights of the tokens sharing the link.

The method may further comprise computing a set of solutions, each solution comprising a unique combination of the candidate routes of the tokens and for each solution: determining a set of items, each item comprising a node or a link which is comprised in a candidate route determined for one or more tokens, and the one or more tokens; computing, for each item, an item value, the item value representing a time needed for a token to browse the node or link comprised in the item, multiplied by the number of tokens comprised in the item; determining a solution value by adding the item values of all the items of the solution; and selecting the solution having the optimal solution value, which provides a set of routes.

The step of computing of the set of candidate routes for a given token may comprise determining the routes having link weights matching a condition related to the token weight of the corresponding token.

Each route may further comprise a route duration value, the token constraints including a duration constraint related to the route duration value, a route of the set of candidate routes satisfying the duration constraint if the route has a route duration value which is inferior or equal to a predefined route maximum value.

Each route may further comprise one transit time value for each node of the route, the token constraints including a time constraint related to the route transit time, a route of the set of candidate routes satisfying the time constraint if all the nodes of the route have a transit time value which is inferior or equal to a predefined node maximum value.

The optimal value may be the highest value among the solution values.

Alternatively, the optimal value may be the lowest value among the solution values.

The method may comprise the filtering of the set of solutions based on a condition related to a comparison, for each item having a shared route link and at least two tokens, between the sum of the token weights of the at least two tokens and the weight of the shared route link of the item.

Each route may further comprise a route cost value, the token constraints including a cost constraint related to the route cost value, a route of the set of candidate routes satisfying the cost constraint if the route has a cost value which is inferior or equal to a predefined maximum cost.

The invention also relates to a computer program product comprising a non-transitory computer readable storage medium, and instructions stored on the non-transitory computer readable storage medium that, when executed by a processor, cause the processor to execute the predefined methods.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
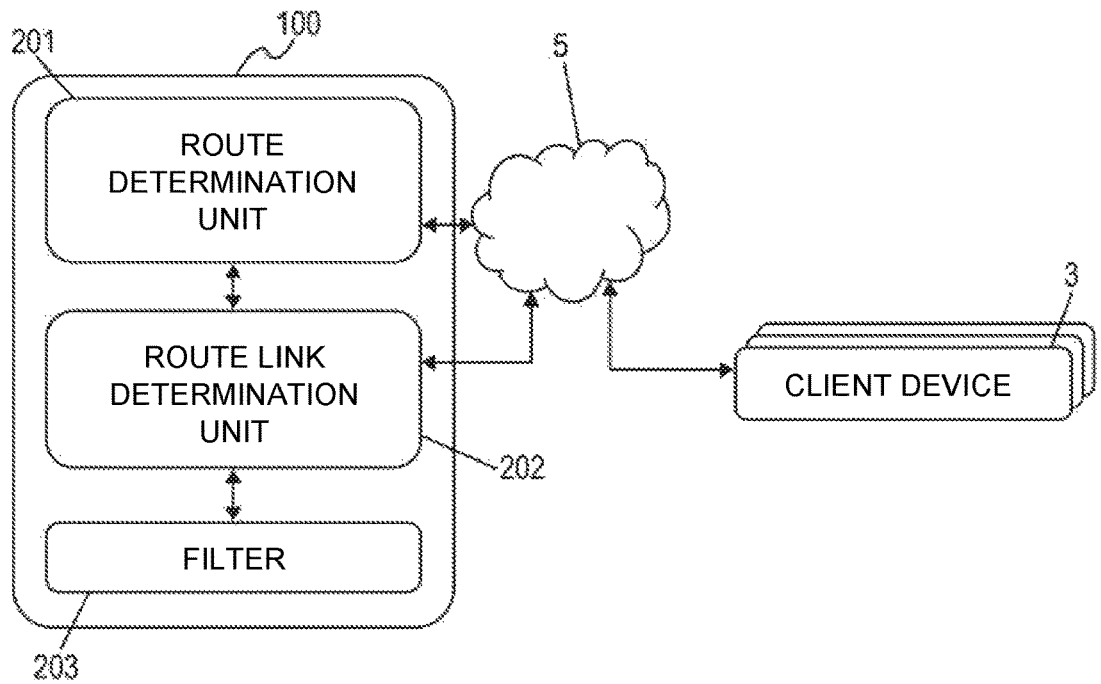
FIG. 1 is a diagram representing an operational environment of the system for the determination of routes.

Referring to FIG. 1, there is shown a system 100 for determining a set of routes in response to a user request received from a client device 3 (also referred to hereinafter as a user device).

A user device 3 may be a personal computing device, a tablet computer, a thin client terminal, a smartphone, and/or any other computing device that enables the user to manage data to the common storage and submit requests to the system 100 over a communication network 5. A user device 3 may host web browsers and/or custom applications software (e.g., a client system) and may include a client user interface (such as a Graphical User Interface GUI).

The communication network 5 may include one or more private and/or public networks (e.g., the Internet) that enable the exchange of data such as the Internet, a local area network (LAN), a wide area network (WAN), a cellular voice/data network, one or more high speed bus connections, and/or other such types of communication network. Each communication network 5 may use standard communications technologies and/or protocols such as 4G, Ethernet, 802.11, TCP/IP (Transmission Control Protocol/Internet Protocol, HTTP (Hypertext Transport Protocol), FTP (File Transfer Protocol), etc. Data can be exchanged over each network 5 according to different data exchange technologies and/or formats such as the hypertext markup language (HTML) and the extensible markup language (XML).

The system 100 may be a content provider system, such as a transaction system implementing a processing flow starting from a user request received by the system for a product corresponding to at least some of the parameters of the request and terminated by a purchase operation of a product through the transaction system (a "transaction" may be for example a "purchase", a "shopping" or a "booking" operation). In a client/server architecture, a "transaction" thus corresponds to a request/response session initiated by a client request and terminated by the purchase of a product (selection of a main product by the user and validation of the selection by payment of the value (or price) associated with the product). In an exemplary application of the invention to the travel field, the content provider system may be a travel provider system.

The system 100 may be configured to determine a set of routes ($S_j$), in a computerized environment, using a graph comprising a plurality of nodes and links connecting the nodes, the set of routes being determined for one or more tokens ($T_K$), each token being associated with an origin node and a destination node included in the graph and with a token weight.

The system 100 may initially receive a set of token constraints for each token ($T_K$), the token constraints received for each token comprising at least one constraint related to the token weight.

The system 100 may comprise a route determination unit 201 configured to determine, for each token ($T_K$), a set of candidate routes satisfying at least some of the token constraints received for the token, each candidate route being connected by the origin node and the destination node associated with the token, the candidate route comprising at least one route link included in the graph, the route link being associated with a link weight.

The system 100 may further comprise a route link determination unit 202 configured to determine shared route links, each shared route link being a route link comprised in a route in the sets of candidate routes determined for at least two tokens.

The system 100 may also comprise a filter 203 configured to filter the set of candidate routes determined for the tokens ($T_K$) based on a condition related to the weight of each shared route link in a route of the sets of candidate routes and to the weights of the tokens sharing the link.

The request parameters of the user request submitted to the content provider system 100 may include "mandatory" and/or "optional" request parameters, the mandatory request parameters being required by the content provider system to process the request.

In an exemplary application of the invention to the travel field, the content provider system 100 may be a booking system configured to provide candidate travel products (travel proposals), such as airline travel products, matching a travel request comprising a specified service set.

The travel request may have a predefined format defining a set of request parameters including:
  departure location/date/time parameters,
  arrival location/date/time parameters;
  additional travel related parameters.

The optional parameters of the user request may include for example the user preferred language, or refining parameters (e.g. time of day, preferred company).

A travel request parameter may have a typology (for example "departure location", "arrival location"), a data category (e.g. location, date), a data type (e.g. char) and/or a data format (defined for example by IATA standard, IATA standing for "International Air Transport Association").

Embodiments of the invention may be implemented by one or more computing system comprising one or more networked computers or servers. The computing systems may provide processing and database functions for the components of the content provider system 100.

The following description of some embodiments of the invention will be made with reference to a travel provider system for illustration purpose.

Figure 2:
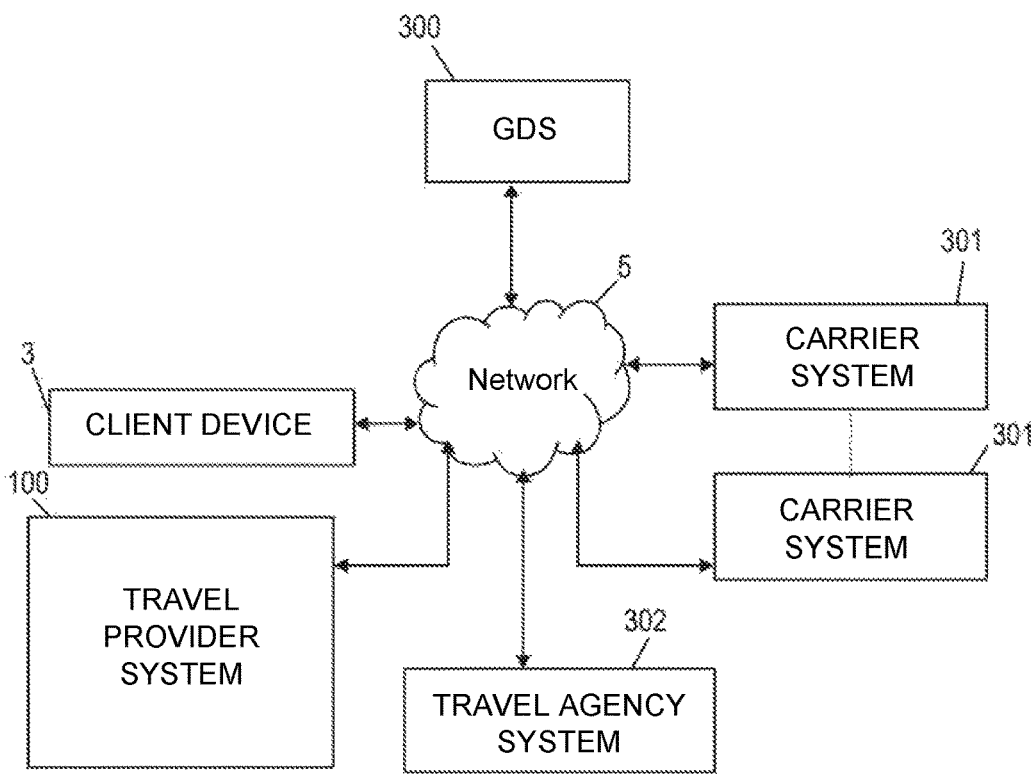
FIG. 2 is a diagram representing an operational environment of a travel provider system.

FIG. 2 represents the operational environment of a travel provider system 100, in an exemplary application of the invention to the travel field. The environment may include a Global Distribution System (GDS) 300, one or more indirect product provider systems, such as carrier systems 301, one or more travel shopping or indirect seller systems (auxiliary content provider systems), such as a travel agency system 302, the travel provider system 100 and one or more client devices 3. Each of the GDS 300, the carrier systems 301, the travel agency system 302, the travel provider system 100, and the user device 3 may communicate through the network 5. The carrier systems 301 may each include a Computer Reservation System (CRS) and/or billing system for the respective airline that enables the GDS 300 and/or travel agency system 302 to reserve and pay for airline tickets. The carrier systems 301 may also interact with each other, either directly or through the GDS 300, to enable a validating carrier to sell tickets for seats provided by an operating carrier. The operating carrier may then bill the validating carrier for the services provided.

The GDS 300 may be configured to facilitate communication between the carrier systems 301 and travel agency system 302 by enabling travel agents, validating carriers, or other indirect sellers to search for available segments and book reservations on one or more carrier systems 301 via the GDS 300. The GDS 300 may maintain links to each of the carrier systems 301 via the network 5 to allow the GDS 300 to obtain scheduling and availability data for segments from the carrier systems 301. The carrier and travel agency systems 301, 302 may thereby book flights, trains, or other types of segments on multiple carriers via a single connection to the GDS 300. The GDS 300 may store and/or maintain a Passenger Name Record (PNR) that includes a complete set of data for an itinerary of a trip, including segments from multiple carriers and/or other travel services comprising the trip such as hotel and rental car reservations.

A travel agency system 302 may include a web server that provides a publicly accessible website. This website may be configured to provide access to travel planning features, such as the ability to search for travel products matching a travel request. To this end, the travel agency system 302 may provide the traveler with access to data from one or more databases hosted by the GDS 300, carrier systems 301, and the travel agency system 302. In an alternative embodiment of the invention, the travel agency system 302 may be a proprietary system that limits access to travel service providers or travel agents. In such case, access may be provided through a private website or other application.

The travel provider system 100 may be in communication with the travel agency system 302 via the network 5 or some other suitable connection. In alternative embodiments of the invention, all or a portion of the travel provider system 100 may be integrated into one or more of the other systems 300, 301, 302. Travelers or travel agents may use the travel agency system 302 to generate and/or search for travel proposals that satisfy a travel request received from the traveler using the travel provider system 100.

The GDS 300, carrier systems 301, the travel agency system 302, the travel provider system 100, and the user devices 3 of the operating environment may be implemented on one or more computing devices or systems, referred to collectively as a computer, such as computer.

Figure 3:
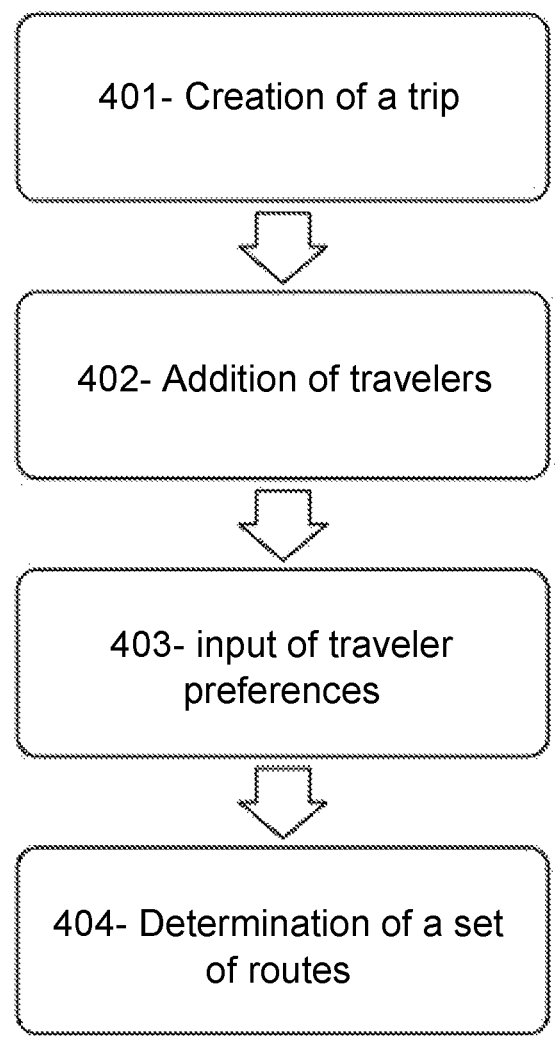
FIG. 3 is a flowchart depicting the process of determination of a set of routes.

FIG. 3 depicts a process of determining routes according to some embodiments of the invention.

Figure 4:
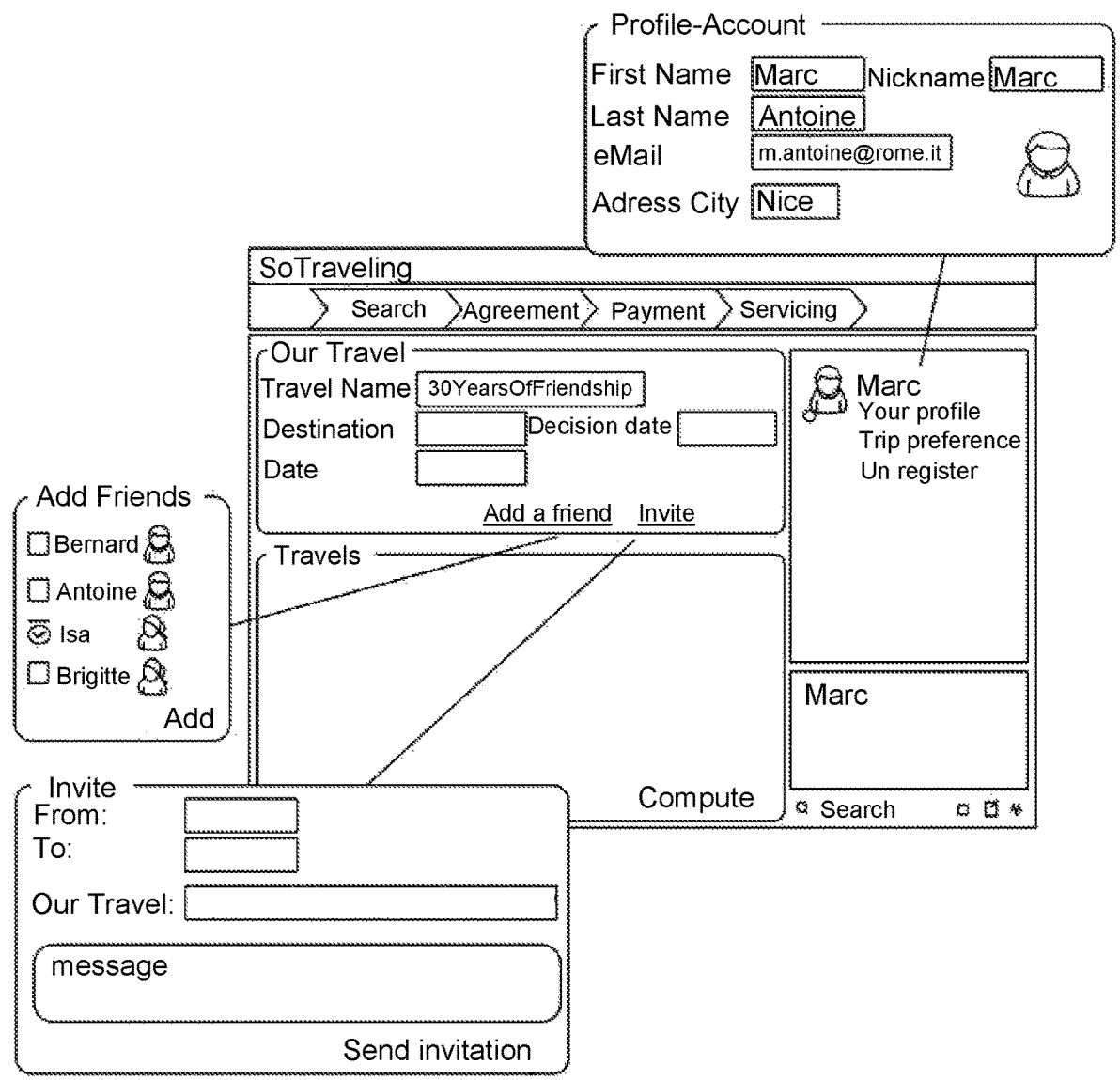
FIG. 4 depicts an exemplary user interface, used by the system according to the invention.

Several client devices 3 may be connected to the travel provider system 100. The client devices 3 may submit transaction requests to the travel provider system 100 according to a client/server approach, through respective user interfaces. Through a dedicated service of the travel provider system 100, one of a user, among a group of users (a 'user' will be also referred to hereinafter as a 'traveler') desiring to travel together for a specific event, may create a trip request on a client device 3, in step 401. For example, with reference to FIG. 4, there is shown an exemplary representation of the user interface, for the creation of a trip request. The user responsible for the creation of the trip request will be referred to hereinafter as an "administrator". The administrator has extended rights on the trip, compared to the other travelers. The administrator may use a profile, which has been previously created, or may alternatively create his profile at the same time as the creation of the trip request. The profile can be created or edited in a dedicated window, as shown in FIG. 4. The profile may comprise at least contact information and an address which may be used as a default entry for the determination of the origin of the travel. The trip request may comprise a parameter representing a common destination for all the users of the group, and travel dates (such as departure and/or arrival dates). The system 100 may generate a unique identifier, also referred to hereinafter as a 'trip identifier' identifying the trip.

A trip may be determined by the system 100 in response to the receipt of a request from the administrator identifying at least the following trip attributes, which comprise at least:

An origin/destination parameter: the participants to the specific event (user of the groups) may intend to start the trip, each from his/her respective city and subsequently meet during the trip to the destination, or the trip back;

The departure date;

The date when the participants have to select a trip proposal.

In step 402, traveler contact information may be added by the administrator, such as a traveler name, an email, a telephone number, so that the other travelers may be notified of the creation of the trip request. The administrator can add travelers, and send them a notification related to the creation of the trip request.

In response to the receipt of the notification by the other users of the group indicating the creation of a trip request, each remaining user can first create a profile, or login to the dedicated service by using a profile which has been previously created. Each user of the group may enter the address corresponding to the origin of the flight (e.g. personal address, professional address, or another address). Each user, including the administrator, may also input a set of preferences for the travel (step 403). The preferences may comprise the maximum travel time, the maximum ground time in a given city during a stopover, and the maximum price the user wants to spend for the travel.

Each user of the group may be identified by a unique identifier, referred to hereinafter as 'traveler identifier', in the system, comprising at least the following attributes:

First Name-Last Name;
Address;
Preferred Airport;
Preferences.

At step 404, a command may be executed to activate determination of a set of routes. The set of routes may comprise a route for each user of the group. The determination of the set of routes may use pieces of information which have been entered by the other travelers of the group, such as their departure address and their preferences.

Figure 5:
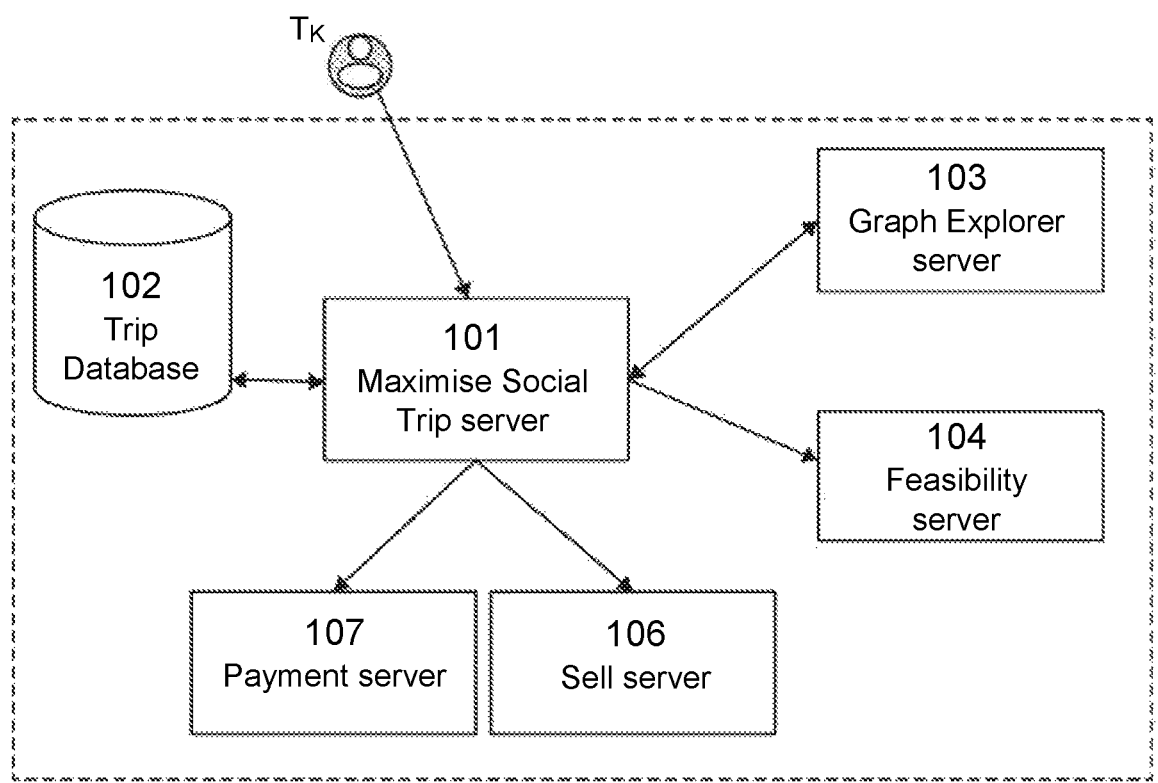
FIG. 5 is a diagram representing the content provider system, according to the invention.

FIG. 5 shows an exemplary implementation of the system 100 in which the invention may be implemented.

In response to the creation of a traveler identifier, a server, called Maximize Social Trip Server 101, receives a token $T_K$ associated to the traveler identifier.

Thus, the token $T_K$ represents the entity which should travel from the origin to the destination using a determined route at a given date for a given cost, based on the profile of the traveler, and based on preferences, which have been entered previously (in step 403). The Maximize Social Trip Server 101 may be coupled to the Trip Database 102, which stores the set of information that is attached to each token $T_K$.

In an exemplary application of the invention to the travel field, the group of users may be a family comprising family members.

In another exemplary application of the invention to the freight transport, the token represents a commodity which should travel from an origin (e.g. a production platform) to a destination (e.g. a sell platform), by using a determined route at a given date for a given cost, based, for example, on the weight and/or volume of the commodity.

A set of information associated with the input preferences may be attached to the token $T_K$ such as:

An origin node $O(T_K)$, based on information entered by the user, and a destination node $D(T_K)$, which is the common destination of all the travelers (or inversely, for a return trip);

The token weight $W(T_K)$, used to determine if the token could cross a link. An embodiment of the weight in the travel industry is the number of travelers intending to travel together. For example, for three family members intending to travel together, the token weight will be equal to three. In the freight industry, the token weight may represent the number of tones and/or the volume of the commodity;

The route maximum value $FTMAX(T_K)$ that each traveler wants to spend from the origin to the destination, at most. In an application of the invention to the travel industry, the route maximum value $FTMAX(T_K)$ may be the maximum overall time that the journey should not exceed;

The node maximum value $FTNMAX(T_K)$ representing the maximum value that each traveler wants to spend on a node, at most. In an application of the invention to the airline industry, this parameter represents the maximum of time that should not be exceeded by a user waiting at an airport before taking the next plane.

The token constraints may also include the maximum cost of a resource The maximum cost of a resource represents the amount of a resource that should not be exceeded for the journey. In an exemplary application of the invention to the airline industry, the route cost value of a resource may be the fuel consumption, the $CO_2$ emission, or the number of kilometers. In an exemplary application of the invention to the freight industry, the route cost value of a resource may be the electricity consumption, which may be required to store refrigerated commodities.

Embodiments of the invention enable determination of a route for each token $T_K$, which provides a set of routes, in a computerized environment.

The Graph Explorer Server 103, which is coupled to the Maximize Social Trip Server 101, may be configured to determine one or more candidate routes to connect an origin node to a destination node, for each token $T_K$. As used herein, the Graph Explorer Server 103 may be implemented in the route determination unit 201. As used herein, a candidate route R is composed of at least two nodes, which represent the origin node and the destination node. The candidate route may also include at least one link between the nodes. A candidate route may include several intermediate nodes as far as there are links connecting these nodes and links to go from the origin node to the destination node.

In an exemplary application of the invention to the airline industry, a candidate route between Nice and New York can integrate additional airports such as Paris, Amsterdam or London. Therefore, there could be three candidate routes:
Nice→Paris→New-York,
Nice→Amsterdam→New-York, and
Nice→London→New-York.

The Graph Explorer Server 103 may store a graph, which comprises a set of nodes N and links L between nodes.

As used herein, a link connects two nodes of the graph, the way to cross the link being unidirectional. A link $L_{NA,NB}$ represents the link connecting the node $N_A$ to the node $N_B$.

The following notation will be used to designate a candidate route is:

$$R^{identifier\ of\ the\ route}_{index\ of\ Origin\ node,\ index\ of\ the\ Destination\ node}$$

The candidate route between the node $N_A$ and $N_D$ will be denoted $R_{A,D}$. Considering for example two candidate routes between the node $N_A$ and $N_D$, one of the candidate routes will be denoted $R_{A,D}^1$, and the other will be denoted $R_{A,D}^2$.

All the nodes and the links participating in a candidate route are defined as an element of a route. As used herein, a "Component" function is defined as follows:
Component(Route) returns the list of all the elements of Route;
Component(Route, index) returns the element of rank index in the route.

Figure 6:
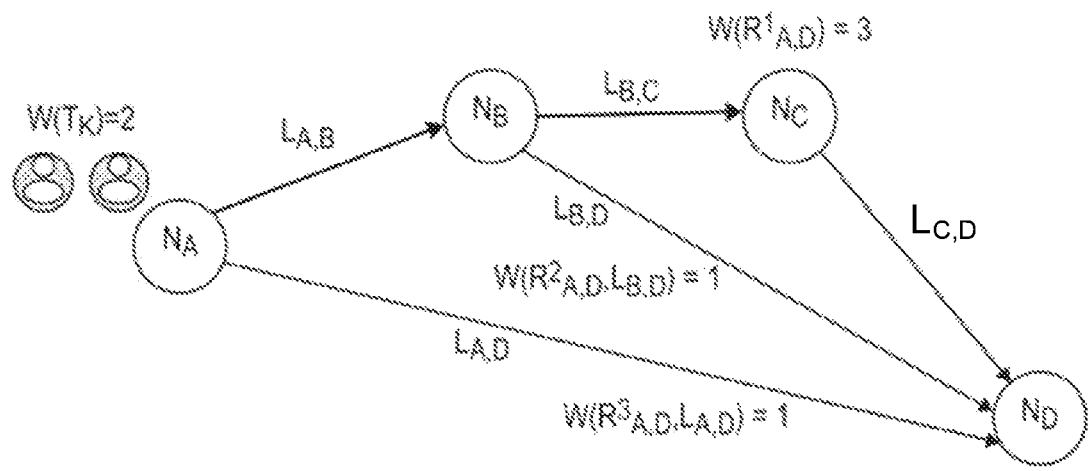
FIG. 6 is a diagram illustrating an exemplary implementation of an embodiment of the invention.

FIG. 6 represents an example of a composition of the candidate routes from $N_A$ to $N_D$. Three routes are possible: $R_{A,D}^1$, $R_{A,D}^2$, $R_{A,D}^3$
Component($R_{A,D}^1$)=($N_A$, $L_{A,B}$, $N_B$, $L_{B,C}$, $N_C$, $L_{C,D}$, $N_D$);
Component($R_{A,D}^2$)=($N_A$, $L_{A,B}$, $N_B$, $L_{B,D}$, $N_D$);
Component($R_{A,D}^3$)=($N_A$, $L_{A,D}$, $N_D$).

The method and the system according to the various embodiments of the invention enable finding a candidate route for each token $T_K$, among the candidate routes which are determined by the Graph Explorer Server 103. Starting from the candidate routes, a list of routes is determined that satisfies token constraints and route constraints. For example, token constraints may be linked to the set of preferences, which have been entered by the traveler in step 403 (for example, the maximum travel time, the maximum ground time in a given city during a stopover). Route constraints may be linked to the availability of seats for each link of the route, considering the weight of each token crossing the link.

In order to evaluate if the token constraints are satisfied, a route duration value and a transit time value may be computed, for all the candidate routes which have been determined by the Graph Explorer Server 103.

The route duration value FT(Route) may be defined as follows:

$$FT(\text{Route}) = \Sigma_{i=1}^{n} FT(\text{Route}, \text{Component}(\text{Route}, i)) \quad \text{(Equation 1)}$$

In Equation (1):
n=Card(Component(Route)); the function 'Card' designates the cardinality function, which returns the number of elements in a list (nodes or links),
FT(Route, Component (Route, Index)) returns a value for the element at the index place in the route, according to the order of graph crossing.

Thus, the transit time value can be considered as the value of the route duration value when the element is a node.

In the example of FIG. 6, for the route 1:

$$FT(R_{A,D}^1) = \Sigma_{i=1}^{7} FT(R_{A,D}^1, \text{Component}(R_{A,D}^1, i)) \quad \text{(Equation 2)}$$

For a token $T_K$ traveling from the origin node $O_K$ to the destination node $D_K$ and the n candidate routes $R_{O_K,D_K}^{(K)-1}$ to $R_{O_K,D_K}^{(K)-n}$ retrieved from the Graph Explorer Server 103 for the token $T_K$, the candidate route i (with in 1 . . . n) is kept if:
$FT(R_{O_K,D_K}^{(K)-i}) \leq FT_{MAX}(T_K)$, where $FTMAX(T_K)$ is the route maximum value, that each traveler wants to spend at most from the origin to the destination route;
$FT(R_{O_K,D_K}^{(K)-i}, N_x) \leq FTN_{MAX}(T_K)$ for all the nodes $N_X$ of the route $R_{O_K,D_K}^{(K)-i}$, where $FTNMAX(T_K)$ is the node maximum value that each traveler wants to spend on a node, at most.

Only the routes validating these criteria are kept. Optionally, the route cost of the resources which are required for the route may be calculated for each route, if a maximum cost value has been previously associated to the token. Routes exceeding the predefined maximum cost may be filtered, and therefore removed from the list of routes.

The FT function and, optionally, the route cost value, may be calculated by the Maximize Social Trip Server 101, based on the candidate routes which are provided by the Graph Explorer Server 103. The Maximize Social Trip Server 101 may be configured to determine the candidate routes which satisfy the token constraints, which have been entered by the user in the user interface.

In an application of the invention to the travel industries (rail, air, bus, car pooling), the route duration value FT(Route) could be the duration of the journey. For example, the route duration value FT(Route) may be for example, in a route $R_{Nice,New\ York}^1$: $FT(R_{Nice,\ New\ York}^1)$ representing the overall time of the trip. $FT(R_{Nice,New\ York}^1, N_{Paris})$ represents the time needed to wait at Paris airport for the flight to New York.

The Maximize Social Trip Server 101 may retain only the candidate route matching the token constraints:
firstly, the duration constraint is satisfied if the candidate route has a route duration value which is inferior or equal to the route maximum value $FTMAX(T_K)$; secondly, the time constraint is satisfied if all the nodes of the candidate route have a transit time value which is inferior or equal to the predefined node maximum value $FTNMAX(T_K)$.

The output is a list of routes, for each token.

The Maximize Social Trip Server 101 may be configured to check whether tokens could share nodes and links on the graph. In particular, the Maximize Social Trip Server 101 may be configured to satisfy the constraints related to token weights and constraints related to links weights, for example by implementing the following three steps.

In a first step, the Maximize Social Trip Server 101 may call the Feasibility server 104 for each token with all the candidate routes attached to the token, which have been output from the Graph Explorer Server 103. In reply, the Feasibility server 104 may return the weight for each link $L_{Ni,Nj}$ joining the node Ni and Nj of a candidate route.

The Maximize Social Trip Server 101 may be configured to check whether all the links constituting the route are suitable to support the tokens which will cross the route. The weight of each link may be then computed using the function W (Route, Component(Route, Index)) which returns the weight for the element at the index place in the route.

The weight for a route W(Route) is defined as:

$$W(\text{Route}) = \min_{i=1...n}(W(\text{Route}, \text{Component}(\text{Route}, i)),$$

with n=Card(Component(Route)).

For a token $T_K$ traveling from an origin $O_K$ to a destination $D_K$, a candidate route $R^i$ is kept as valid if $W(R_{O,D}^{(K)-i}) \geq W(T_K)$ In the example of FIG. 6, for the route 1.

$$W(R_{A,D}^1) = \min_{i=1...7}(W(R_{A,D}^1, \text{Component}(R_{A,D}^1, i)) = 3 \geq W(T_k)$$

With Component($R_{A,D}^1$)=($N_A$, $L_{A,B}$, $N_B$, $L_{B,C}$, $N_C$, $L_{C,D}$, $N_D$)

The token $T_K$ with a weight of 2 [$W(T_K)$=2] goes from the origin $N_A$ to the destination $N_D$:

Component ($R_{A,D}^{(K)-1}$)=($N_A$, $L_{A,B}$, $N_B$, $L_{B,C}$, $N_C$, $L_{C,D}$, $N_D$)

Component ($R_{A,D}^{(K)-2}$)=($N_A$, $L_{A,B}$, $N_B$, $L_{B,D}$, $N_D$)

Component ($R_{A,D}^{(K)-3}$) ($N_A$, $L_{A,D}$, $N_D$)

As $W(R_{A,D}^{(K)-2}, L_{B,D}) < W(T_K)$ and $W(R_{A,D}^{(K)-3}, L_{A,D}) < W(T_K)$, the route 2 and 3 are filtered by the filter 203, by removing them from the solution for $T_K$. Only the candidate route 1 thus remains.

In such implementation, the link with the smallest weight represents the limitation of the route. For example, in an application to the travel industry, for a route from Nice to New York via Paris, the leg which has the smallest number of available seats represents the limitation of the route.

It is noted that, in an application to the airline industry, there is usually no constraint concerning the node weight, but rather concerning the link weight. So, it can be assumed that:

$W(R_{A,D}^1, N_A) = W(R_{A,D}^1, N_B) = W(R_{A,D}^1, N_C) = W(R_{A,D}^1, N_D) = \infty$ In a second step, the Maximize Social Trip Server 101 may be configured to integrate all the tokens of the trip, and determine an exhaustive set of solutions $\{S_1^J, \ldots, S_n^J\}$ for the tokens crossing the graph at the same date. A solution is composed by a list of candidate routes with only one candidate route per token.

Each solution $S_i^J$ comprises one candidate route for each token. Thus, each solution of the set of solutions comprises a unique combination of the candidate routes, for each token. The notation $S_i^J$ refers to the solution i for a journey J.

Figure 7:
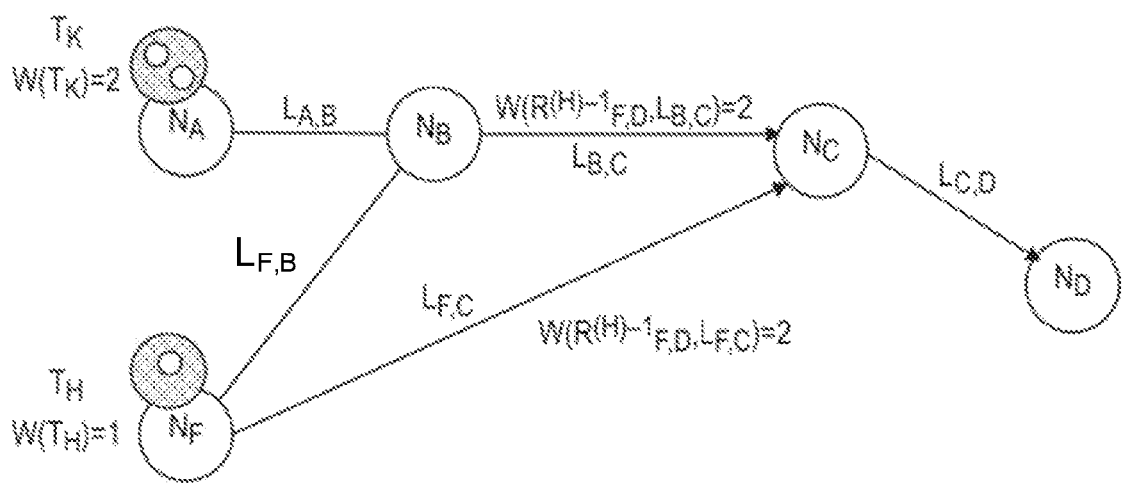
FIG. 7 is a diagram illustrating another exemplary implementation of an embodiment of the invention.

In the example of FIG. 7, the token $T_K$, with a token weight of 2, travels from node $N_A$ to node $N_D$, and only one candidate route is feasible $R_{A,D}^{(K)-1}$ based on the aforementioned first step.

For the token $T_H$ going from $N_F$ to $N_D$ with a token weight of 1, the two following candidate routes are possible, based on the aforementiontt first step:

Component ($R_{F,D}^{(H)-1}$)=$N_F$, $L_{F,B}$, $N_B$, $L_{B,C}$, $N_C$, $L_{C,D}$, $N_D$)

Component ($R_{F,D}^{(H)-2}$)=$N_F$, $L_{F,C}$, $N_C$, $L_{C,D}$, $N_D$)

The solutions are the following:

$S_1^J = (R_{A,D}^{(K)-1}, R_{F,D}^{(H)-1})$ $S_2^J = (R_{A,D}^{(K)-1}, R_{F,D}^{(H)-2})$

In a third step, the exhaustive set of solutions which has been built in the second step may be analyzed to determine whether the token could share the part of the route. A link which is crossed by at least one token is called "shared route link". This is done by the route link determination unit 202, by checking whether each shared route link has a link weight greater or equal to the addition of the token weights crossing the shared route link.

The function SPLIT takes in input a solution $S_i^J$ and returns a list of items: SPLIT($S_i^J$)=(IT$_1$, ..., IT$_n$)

The item IT$_i$ is a couple composed by an element Elmt (node or link) and a list of tokens sharing this element on the route: IT$_i$=(Elmt, TokenList)

For example, on FIG. 7, the item 4 is defined as:

$IT_4 = (L_{B,C}, (T_K, T_H))$ $IT_4$ represents the sharing of the link $L_{B,C}$ by the token $T_K$ and $T_H$ in the solution $S_1^J$.

A solution $S_i^J$ is valid if all the items IT$_i$ returned by SPLIT($S_i^J$) satisfy the condition that the link weight of the element is greater or equal to the sum of all the token weights which are present in the list of the items.

For IT$_i$=(Elmt, TokenList)

$W(\text{Elmt}) \geq \Sigma_{i=1}^{Card(TokenList)} W(T_i)$

In the example FIG. 7, for the solution $S_1^J = (R_{A,D}^{(K)-1}, R_{F,D}^{(H)-1})$ Component ($R_{A,D}^{(K)-1}$)=($N_A$, $L_{A,B}$, $N_B$, $L_{B,C}$, $N_C$, $L_{C,D}$, $N_D$)

Component ($R_{A,D}^{(H)-1}$)=($N_F$, $L_{F,B}$, $N_B$, $L_{B,C}$, $N_C$, $L_{C,D}$, $N_D$)

SPLIT($S_1^J$)=(IT$_1$, IT$_2$, IT$_3$, IT$_4$, IT$_5$, IT$_6$, IT$_7$, IT$_8$, IT$_9$)

IT$_1$=($N_A$, ($T_K$))

IT$_2$=($L_{A,B}$, ($T_K$))

IT$_3$=($N_B$, ($T_K$, $T_H$))

IT$_4$=($L_{B,C}$, ($T_K$, $T_H$))

IT$_5$=($N_C$, ($T_K$, $T_H$))

IT$_6$=($L_{C,D}$, ($T_K$, $T_H$))

IT7=($N_D$, ($T_K$, $T_H$))

IT8=($N_F$, ($T_H$))

IT9=($L_{F,B}$, ($T_H$))

In such implementation, item 4 does not meet the constraint of sharing the link $L_{B,C}$ as $W(L_{B,C})$=2 and $\Sigma_{i=K,H} W(T_i)$=3. The solution $S_i^J$ is not valid and is filtered, by the filter 203, by removing it, so only the solution $S_2^J = (R_{A,D}^{(K)-1}, R_{F,D}^{(H)-2})$ is kept.

Each solution $S_i^J$, comprising one candidate route per token, satisfies the constraints relative to the token weights, and the weights of the shared route links.

The solutions $S_i^J$ may be then evaluated so as to determine which solution $S_i^J$ offers an optimized sharing of the routes.

A benefit value associated to a solution $S_i^J$ may be further computed. Such value, which represents the benefit value of the solution i for the journey J, is denoted $SV_i^J$, and may be computed by the SV function as follows:

$$SV_i^J = SV(S_i^J) = \Sigma_{k=1}^{Card(SPLIT(S_i^J))} SV(IT_K) \quad \text{(Equation 3)}$$

In Equation 3:

IT$_k$ is part of the item returned by the split function SPLIT($S_i^J$)

SV(IT$_k$)=FV(Cpt)*card(TokenList);

IT$_k$=(Componentt, TokenList).

In an application of the invention to the travel industry, this function may be a function determining the time spent by at least two travelers during their journey in airport and in flight. Such time may be maximized when the travelers are friends or minimized for CEO travelers to mitigate the risks for the company. In an application of the invention to the freight field, this function could represent the time spent by carried commodities from different origins. The function may be optimized to reflect the sharing of commodities.

The solutions may then be ranked, based on the benefit of each solution for the journey. The solution which has the optimal solution value (minimal or maximal, depending on the context) may be stored. Such solution comprises the set of routes for the tokens.

Once all the travelers have agreed on the set of routes, they may connect to a Sell server 106. At this moment, the following data are known for each passenger:

Origin-connecting points-destination for outbound;
Origin-connecting points-destination for inbound;
The number of passengers for each bound (token weight);
The typology from each passenger (Adult/child/Infant/ . . . )
The details of the fare basis selected;
The shared route links (in order to try to block adjacent seats).

The Sell Server 106 may initiate parallel process to request for each set of passengers booking actions to secure the various bookings. A global file may be created to aggregate at a higher level all the details from the various bookings, and to link all the individual PNRs. The global file links all the individual PNRs, in order to allow a common process of all the linked PNRs, so as to ensure that the group is side by side in their common legs of the travel. Besides, linking the PNRs ensures to the group relevant re-accommodation or coherent compensation in case of disruption of the trip.

The payment may be managed by a Payment server 107. As the group travelers may not live in the same time zone, the Payment server 107 is configured to enable asynchronous payment by each traveler within a predefined timeline. The travelers can decide if they all pay the exact same amount, or if each traveler pays her/his own trip. Then, each traveler may receive a link for her/his booking, from the Payment server 107, to make the payment.

Two options can be proposed for the payment, according to what has been decided initially by the group at the beginning.

According to a first option, the travels may be booked individually. Each member of the group of traveler may then pay for his/her travel; the tickets for his/her travel will be then issued immediately. In such case, a traveler can decide not to complete this/her booking (if he or she changed her mind for example).

According to a second option, the travel may be definitively booked only if all travelers have duly completed their payments.

The second option may encompass two embodiments.

In a first embodiment of the second option, each traveler proceeds with the payment his/her part. The payment from each traveler is then collected, and validity of the payment checked. Each payment may be made for the amount of each individual PNR. If at the end of a pre-defined period, at least one payment is missing, all payment transactions will be reversed and the pre-booked PNR are cancelled. If all payments are completed, the PNRs are committed and the tickets issued.

In a second embodiment of the second option, each traveler proceeds with the payment of an equal amount. In such case, the payments may be collected by a third party, for example a travel agent. Then, the third party may proceed with the payment for each PNR. Lastly, the PNRs may be committed and the tickets issued. If not all payments are done, the PNRs are cancelled.

An application of the invention to the travel industry may comprise finding of common flight and airport for people that want to share a part of their journey together. The users of the groups could be friends starting the trip from different cities and having a common destination for their trip to share maximum time travelling together. Each traveler can define constraints related to the time of the travel, the time waiting at an airport and/or to the cost of his/her travel.

In an application of the invention to the freight industry, freight companies may use the invention to optimize the storage in cold room and grouping commodities to optimize truck usage from their production area to their selling area.

Figure 8:
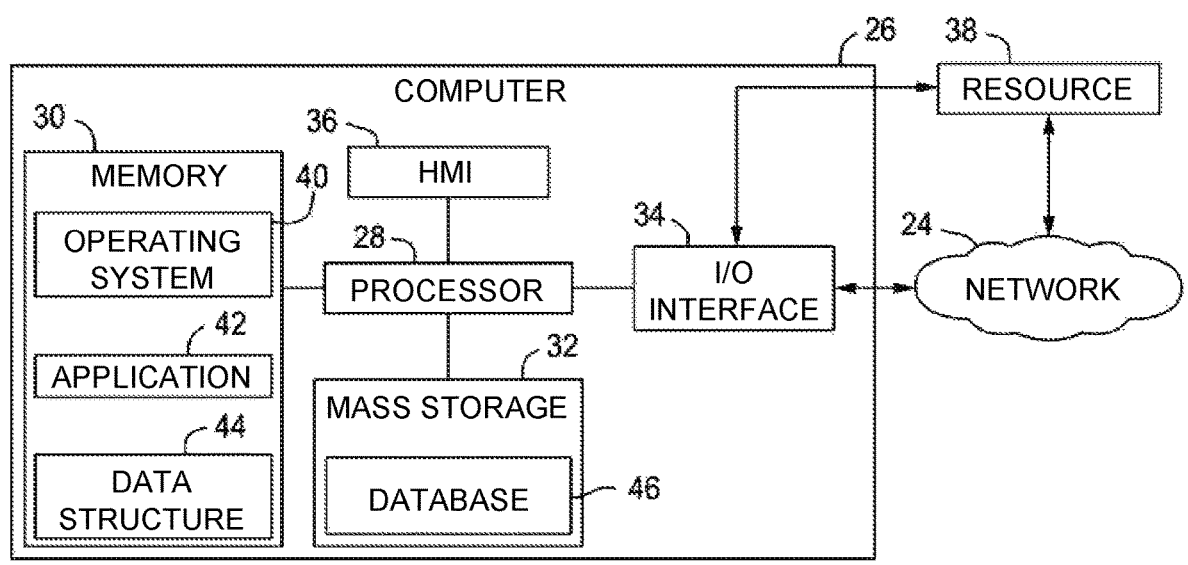
FIG. 8 is a diagrammatic view of an exemplary computing system for hosting a component of the environment of FIG. 1.

Referring now to FIG. 8, the system 100, one or more blocks of the system 100 as well as the systems or devices of the operating environment may be implemented on one or more computing devices or systems, referred to collectively as a computer, such as computer 26. The computer 26 may include a processor 28, a memory 30, a mass storage memory device 32, an input/output (I/O) interface 34, and a Human Machine Interface (HMI) 36. The computer 26 may also be operatively coupled to one or more external resources 38 via the network 24 or 1/O interface 34. External resources may include, but are not limited to, servers, databases, mass storage devices, peripheral devices, cloud-based network services, or any other suitable computer resource that may be used by the computer 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. The memory 30 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

The processor 28 may operate under the control of an operating system 40 that resides in the memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or the one or more external resources 38. The application 42 may thereby work cooperatively with the network 24 or the external resources 38 by communicating via the I/O interface 34 to provide the various features, functions, applications, processes, or modules comprising embodiments of the invention. The application 42 may also have program code that is executed by the one or more external resources 38, or otherwise rely on functions or signals provided by other system or network components external to the computer 26. Indeed, given the nearly endless hardware and software configurations possible, persons having ordinary skill in the art will understand that embodiments of the invention may include applications that are located externally to the computer 26, distributed among multiple computers or other external resources 38, or provided by computing resources (hardware and software) that are provided as a service over the network 24, such as a cloud computing service.

The HMI 36 may be operatively coupled to the processor 28 of computer 26 in a known manner to allow a user to interact directly with the computer 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, pushbuttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules.

While conventional solutions process the availability requests and the pricing requests for the relevant routes of each of the user, the embodiments of the invention enable saving a dramatic volume of availability requests and pricing requests, such request being processed only for the relevant routes of the group which have been identified by the Maximize Social Trip Server 101.

Further, the embodiments of the invention enable optimization of the look-to-book ratio (the percentage of users accessing a content provider system website with respect to those who actually make a purchase) by removing the individual search requests. Such optimization of the look-to-book ratio results in a significant reduction of the computational resources of the content provider system.

What is claimed is:

1. A system for:
(i) determining a set of routes ($S_j$), in a computerized environment and in response to a user request received from a client device, using a graph comprising a plurality of nodes and a plurality of links connecting the nodes, the set of routes being determined for at least two tokens ($T_K$), each token being associated with an origin node and a destination node included in the graph and with a token weight, and
(ii) determining a set of solutions, each solution of the set of solutions comprising a unique combination of the candidate routes for the at least two tokens ($T_K$), . . .
wherein the system includes at least one processor and a memory containing instructions that, when executed by the at least one processor, cause the at least one processor to perform operations comprising:
receiving a set of token constraints for each token ($T_K$), the token constraints received for each token comprising at least one constraint related to the token weight;
determining, for each token ($T_K$), a set of candidate routes satisfying at least one of the token constraints received for the token, each candidate route being connected to the origin node and the destination node associated with the token, the candidate route comprising at least one route link included in the graph, the route link being associated with a link weight;
determining shared route links, each shared route link being a route link comprised in a route in the sets of candidate routes determined for the at least two tokens;
filtering the set of candidate routes determined for the at least two tokens ($T_K$) based on a condition related to the weight of each shared route link in a route of the sets of candidate routes and to the weights of the tokens sharing the link;
determining a set of items ($IT_i$), each item ($IT_i$) comprising one or more tokens of the at least two tokens ($T_K$) and a node or a link which is comprised in a candidate route determined for the at least two tokens ($T_K$);
computing, for each item ($IT_i$), an item value, the item value representing a time needed for a token to browse the node or link comprised in the item ($IT_i$), multiplied by the number of tokens ($T_K$) comprised in the item ($IT_i$);
determining, for each solution of the set of solutions, a solution value by adding the item values of all the items ($IT_i$) of each respective solution;
selecting an optimal solution of the set of solutions having the optimal solution value, which provides a set of routes ($S_i$); and
providing the selected optimal solution to a user interface at the client device.

2. The system of claim 1, wherein the optimal solution value is the highest value among the solution values.

3. The system of claim 1, wherein the optimal solution value is the lowest value among the solution values.

4. The system of claim 1, wherein the system is configured to filter the set of solutions based on a condition related to a comparison, for each item ($IT_i$) having a shared route link and at least two tokens ($T_K$), between the sum of the token weights of the at least two tokens ($T_K$) and the weight of the shared route link of the item ($IT_i$).

5. The system of claim 1, wherein the system is configured to compute the set of candidate routes for a given token ($T_K$) by determining the routes having link weights matching a condition related to the token weight of the corresponding token ($T_K$).

6. The system of claim 1, wherein each route further comprises a route duration value, the token constraints including a duration constraint related to the route duration value, a route of the set of candidate routes satisfying the duration constraint if the route has a route duration value which is inferior or equal to a predefined route maximum value.

7. The system of claim 1, wherein each route further comprises one transit time value for each node of the route, the token constraints including a time constraint related to the route transit time, a route of the set of candidate routes satisfying the time constraint if all the nodes of the route have a transit time value which is inferior or equal to a predefined node maximum value.

8. The system of claim 1, wherein each route further comprises a route cost value, the token constraints including a cost constraint related to the route cost value, a route of the set of candidate routes satisfying the cost constraint if the route has a cost value which is inferior or equal to a predefined maximum cost.

9. A method for:
(i) determining a set of routes ($S_j$), in a computerized environment and in response to a user request received from a client device, using a graph comprising a plurality of nodes and a plurality of links connecting the nodes, the set of routes being determined for at least two tokens ($T_K$), each token being associated with an origin node and a destination node included in the graph and with a token weight, and
(ii) determining a set of solutions, each solution of the set of solutions comprising a unique combination of the candidate routes for the at least two tokens ($T_K$), the method comprising:
receiving a set of token constraints for each token ($T_K$), the token constraints received for each token comprising at least one constraint related to the token weight;
determining, for each token ($T_K$), a set of candidate routes satisfying at least one of the token constraints received for the token, each candidate route being connected to the origin node and the destination node associated with the token, the candidate route comprising at least one route link included in the graph, the route link being associated with a link weight;
determining shared route links, each shared route link being a route link comprised in a route in the sets of candidate routes determined for the at least two tokens;
filtering the set of candidate routes determined for the at least two tokens ($T_K$) based on a condition related to the weight of each shared route link in a route of the sets of candidate routes and to the weights of the tokens sharing the link;
determining a set of items ($IT_i$), each item ($IT_i$) comprising one or more tokens of the at least two tokens ($T_K$) and a node or a link which is comprised in a candidate route determined for the at least two tokens ($T_K$)
computing, for each item ($IT_i$), an item value, the item value representing a time needed for a token to browse the node or link comprised in the item ($IT_i$), multiplied by the number of tokens ($T_K$) comprised in the item ($IT_i$);
determining, for each solution of the set of solutions, a solution value by adding the item values of all the items ($IT_i$) of each respective solution;
selecting an optimal solution of the set of solutions having the optimal solution value, which provides a set of routes (S); and
providing the selected optimal solution to a user interface at the client device.

10. The method of claim 9, wherein computing the set of candidate routes for a given token ($T_K$) comprises:
determining the routes having link weights matching a condition related to the token weight of the corresponding token ($T_K$).

11. The method of claim 9, wherein the optimal solution value is the highest value among the solution values.

12. The method of claim 9, wherein the optimal solution value is the lowest value among the solution values.

13. The method of claim 9, wherein the set of solutions are filtered based on a condition related to a comparison, for each item ($IT_i$) having a shared route link and at least two tokens ($T_K$), between the sum of the token weights of the at least two tokens ($T_K$) and the weight of the shared route link of the item ($IT_i$).

14. The method of claim 9, wherein each route further comprises a route duration value, the token constraints including a duration constraint related to the route duration value, a route of the set of candidate routes satisfying the duration constraint if the route has a route duration value which is inferior or equal to a predefined route maximum value.

15. The method of claim 9, wherein each route further comprises one transit time value for each node of the route, the token constraints including a time constraint related to the route transit time, a route of the set of candidate routes satisfying the time constraint if all the nodes of the route have a transit time value which is inferior or equal to a predefined node maximum value.

16. The method of claim 9, wherein each route further comprises a route cost value, the token constraints including a cost constraint related to the route cost value, a route of the set of candidate routes satisfying the cost constraint if the route has a cost value which is inferior or equal to a predefined maximum cost.

17. A computer program product comprising:
a non-transitory computer readable storage medium; and
instructions stored on the non-transitory computer readable storage medium, the instructions for:
(i) determining a set of routes ($S_j$), in a computerized environment and in response to a user request received from a client device, using a graph comprising a plurality of nodes and a plurality of links connecting the nodes, the set of routes being determined for at least two tokens ($T_K$), each token being associated with an origin node and a destination node included in the graph and with a token weight, and
(ii) determining a set of solutions, each solution of the set of solutions comprising a unique combination of the candidate routes for the at least two tokens ($T_K$)
wherein the instructions, when executed by a processor, cause the processor to:
receive a set of token constraints for each token ($T_K$), the token constraints received for each token comprising at least one constraint related to the token weight;
determine, for each token ($T_K$), a set of candidate routes satisfying at least one of the token constraints received for the token, each candidate route being connected to the origin node and the destination node associated with the token, the candidate route comprising at least one route link included in the graph, the route link being associated with a link weight;
determine shared route links, each shared route link being a route link comprised in a route in the sets of candidate routes determined for the at least two tokens;
filter the set of candidate routes determined for the at least two tokens ($T_K$) based on a condition related to the weight of each shared route link in a route of the sets of candidate routes and to the weights of the tokens sharing the link;
determine a set of items ($IT_i$), each item ($IT_i$) comprising one or more tokens of the at least two tokens ($T_K$) and a node or a link which is comprised in a candidate route determined for the at least two tokens ($T_K$)
compute, for each item ($IT_i$), an item value, the item value representing a time needed for a token to browse the node or link comprised in the item ($IT_i$), multiplied by the number of tokens ($T_K$) comprised in the item ($IT_i$);

determine, for each solution of the set of solutions, a solution value by adding the item values of all the items ($IT_i$) of each respective solution;

select an optimal solution of the set of solutions having the optimal solution value, which provides a set of routes ($S_j$); and provide the selected optimal solution to a user interface at the client device.

\* \* \* \* \*

UNITED STATES PATENT AND TRADEMARK OFFICE
CERTIFICATE OF CORRECTION

PATENT NO. : 11,898,858 B2
APPLICATION NO. : 17/009141
DATED : February 13, 2024
INVENTOR(S) : Michel Demazeau et al.

Page 1 of 1

It is certified that error appears in the above-identified patent and that said Letters Patent is hereby corrected as shown below:

In the Claims

Column 17, Claim 9, Line 53 reads:
"set of routes (S); and"
It should read:
--set of routes ($S_j$); and--

Signed and Sealed this
Twelfth Day of March, 2024

Katherine Kelly Vidal
*Director of the United States Patent and Trademark Office*